Feb. 10, 1959 W. C. AVREA 2,873,436
BRAKE TRAVEL INDICATOR
Filed April 4, 1957 2 Sheets-Sheet 1
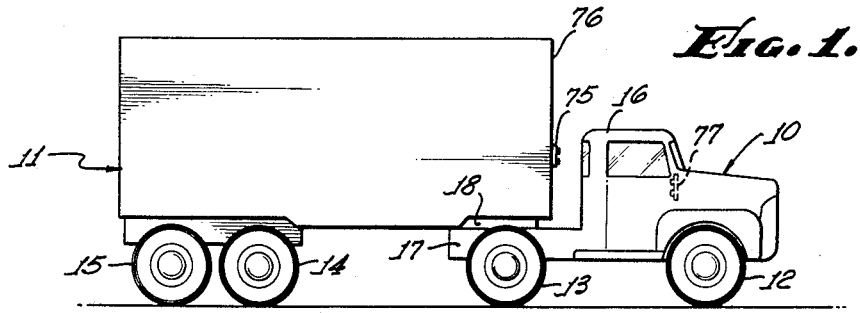
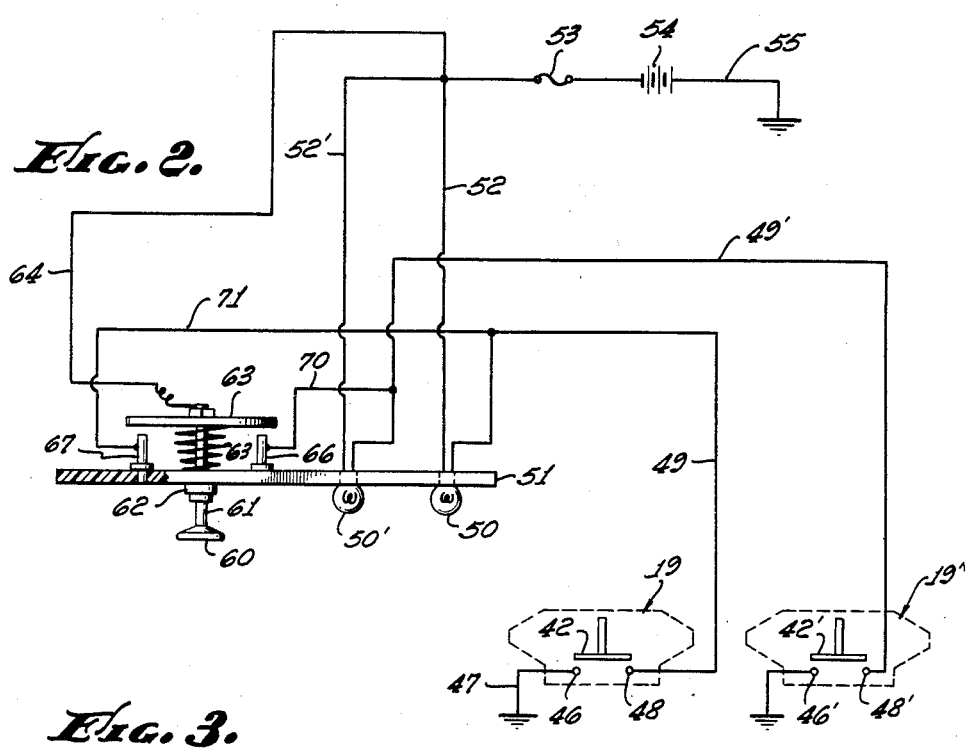
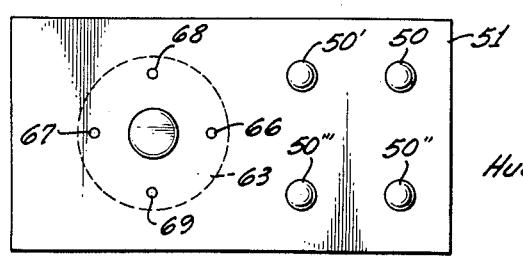
WALTER C. AVREA
INVENTOR.
Huebner, Beehler & Worrel.
BY
ATTORNEYS.

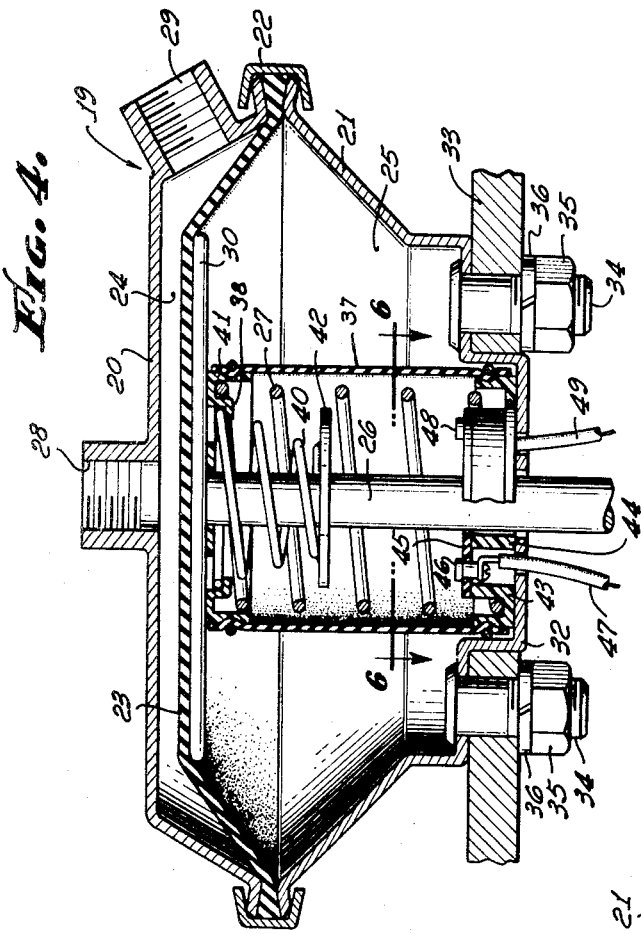

United States Patent Office 2,873,436
Patented Feb. 10, 1959

2,873,436
BRAKE TRAVEL INDICATOR

Walter C. Avrea, Rivera, Calif., assignor to Sierra Precision, Inc., Monrovia, Calif., a corporation of California Application April 4, 1957, Serial No. 650,660

8 Claims. (Cl. 340—52)

The invention relates to indicator devices and has special reference to an indicator device by means of which it may be determined whether or not any one or all of a multiple number of brakes on an automotive vehicle are in condition for proper operation.

Highway conditions resulting in a multitude of accidents has focused attention upon causes of accidents and possible remedies. According to reliable data about seventy percent of the fatal accidents occurring on highways throughout the country is due to faulty brakes. Of special interest is the fact that among those accidents due to brakes or wherein faulty brakes are a contributing factor substantially ninety-seven percent are due to improper manipulation by the driver, either over-driving the brakes or a condition wherein the brakes become non-operational due to excess heat. Of the remaining three percent a survey shows that two percent is accountable to mechanical failure such as brakes not adjusted or improperly adjusted due to a mechanic turning the slack adjuster the wrong way. The remaining one percent of accidents are due to mechanical failure such as broken air lines, mal-functioning valves, and the like.

Although considerable attention in the past has been given to the provision of remedies and means of detecting such things as improperly acting valves and lack of proper air pressure, even a one hundred percent elimination of such defects leaves 99 percent of the defective possibilities undetected. Loss of air pressure is very rarely the cause of an accident and at the same time is a condition not too difficult to detect.

One of the disturbing factors with respect to brake action is that when subjected to test, the ability of brakes to hold a vehicle properly is usually revealed by test apparatus even though there may be only one-eighth inch of plunger travel remaining with which to set the brakes. It should be borne in mind in this connection that brakes on automotive vehicles are set by air pressure rather than being set by spring return as is the case on railroad vehicles equipped with the usual air brake systems appropriate to that means of transportation.

Where there remains only a one-eighth inch plunger travel left to set brakes, the driver and the person testing the brakes will have a completely false impression of the brakes being good even though continued operation for five minutes longer might bring the vehicle to the brink of a complete run-away. Where such a circumstance exists, particularly as a result of an operator riding the brake thereby overheating the brake equipment, the brake will be returned to normal operation by five minutes of non-use during which the brake equipment may be permitted to cool.

Since the air actuated plunger employed for setting the brake is normally one which acts through a considerable distance, depending upon the condition of the brake, the available remaining travel distance which should be maintained for safety is a somewhat arbitrary distance but under ordinary circumstances a remaining available travel of about one-half inch can be counted upon to provide a reasonable margin of safety.

Among those articles of equipment which have been offered heretofore as a means of testing has been a rheostat type electric indicating gage similar to those employed for measuring the depth of gasoline in a gas tank. Gages of this type have definite limitations in that they are not dependable and are too inaccurate to be relied upon for testing such critical portions of the automotive equipment as the brakes. Other types of indicating equipment which have been tried have been arms and bars added to the brake equipment which themselves are likely to be broken or knocked out of adjustment to the extent that reliance cannot be placed upon them. Moreover, regulations recently adopted require that though detecting equipment may be added, it must be such that it does not add or remove anything with respect to the brake system and must be such that, if broken under any circumstances, would not render the system inoperative.

It is therefore among the objects of the invention to provide a new and improved brake condition indicating device which will indicate to the driver of a vehicle the amount of available plunger travel remaining with which the brakes may continue to be set.

Another object of the invention is to provide a new and improved brake condition indicating system which will be a positive indication of the brake condition for each wheel, the system being operable either to detect brakes in improper condition before the vehicle run is commenced or to detect the condition of brakes at any time throughout the run.

Still another object of the invention is to provide a new and improved brake condition indicating system which requires no change whatever in the normal brake construction or operation, the system being one capable of insertion into the mechanism within space unoccupied by other portions of the mechanism and by the addition of a limited number of electric switching elements which can be incorporated into the usual brake mechanism without necessitating any change in the mechanism itself.

A still further object of the invention is to provide a new and improved brake condition indicating apparatus which is readily capable of being tested for operation of the system itself either before or during operation of the vehicle, thereby to give the operator assurance that when the brakes are tested, the condition will be capable of indication in the expected fashion.

Still further among the objects of the invention is to provide a new and improved brake condition indicating system which is fail-safe in its structure and operation and which is compact, inexpensive, and convenient to install to such an extent that the system can be added to virtually any of the usual brake systems currently in use while still in use on the respective vehicles.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a side elevational view of a tractor and trailer combination commonly in widespread use on the highways throughout the country.

Figure 2 is a schematic view accompanied by a wiring diagram showing the brake condition indicating system.

Figure 3 is a front elevational view of the panel shown in Figure 2.

Figure 4 is a longitudinal sectional view of one embodiment of the invention showing a point on the indicating system in the position occupied when the brake is released.

Figure 5 is a fragmentary sectional view similar to Figure 4 but showing the portion of the brake indicating system and brake mechanism when the brake is applied.

Figure 6 is a fragmentary cross-sectional view taken on the line 6—6 of Figure 4.

Although the brake system herein illustrated as containing the indicator mechanism forming the subject matter of the invention has been noted as one particularly applicable to trucks and trailers, this type of system has been chosen only because due to many serious accidents resulting from run-away truck equipment on long hills the proper functioning of brake systems on such vehicles is of exceptional importance. The brake indicating system, however, is one of such simplicity as to be applicable to comparable brake equipment on virtually any vehicle.

By way of example only, therefore, there is shown an embodiment of the invention chosen for the purpose of illustration which features a conventional automotive tractor 10, behind which is mounted a trailer 11 hitched to the tractor to be drawn thereby. The tractor is shown equipped with a pair of front wheels 12 and a pair of rear wheels 13. In this instance the trailer is equipped with two pairs of rear wheels 14 and 15 respectively. The tractor is equipped with the usual cab 16 for the driver and mounts a rear portion 17 equipped with the customary conventional hitch 18 by means of which the trailer is attached.

Although there are a great many mechanical variations prevalent in brake chambers and varieties of mechanical parts, these chambers all follow substantially the same principle of operation to the extent that one only has been chosen by way of illustration inasmuch as the principle present in the brake indicating system is equally applicable to virtually all types of systems. These brake mechanisms are attached to the conventional brake shoe devices in the same uniform fashion and consequently have not been shown herein. It will be borne in mind that, following the usual practice, brake shoes are constructed in two halves and located within a brake drum mounted in such fashion that when a brake actuating plunger is activated, the brake shoes will be expanded into engagement with the brake drum.

Troublesome conditions exist when, for example, brakes have been lightly applied for a long run downhill and the brake drum gets excessively hot and expands. Expansion is often so great that the plunger travel extends to virtually the full limit of its range in order to push the brake shoes outwardly far enough to have them engage the brake drum. If the expansion has been too great, the plunger will not be capable of traveling far enough to engage the brake shoes with the brake drum even though the lining is in perfect condition and all other portions of the brake mechanism are functioning properly. Since this is a mechanical condition which arises after the vehicle has started its run over the highway, it is a condition which cannot be detected by testing in the service yard by any known means before the run is begun.

In a chosen embodiment of the invention and by way of example only there is illustrated a pneumatic brake unit comprising a housing indicated generally by the reference character 19 consisting of two parts or units, namely, a pressure plate 20 and a non-pressure plate 21 bound together by means of an appropriate conventional clamp ring 22 of well-known construction. A diaphragm 23 is bound between the plates and divides the chamber therein into a section 24 subject to air pressure for operating the brake and a section 25 at atmospheric pressure and adapted to contain a push rod or plunger assembly 26, a return spring 27 and such other appropriate mechanism as may be applicable to the system. For operating purposes compressed air is supplied through an inlet port 28 and adapted to be exhausted through an exhaust or outlet port 29.

The plunger assembly includes a plate 30 which operates against the mid-portion of the diaphragm 23, the diaphragm being flexible as noted and subject to movement in a brake setting direction in response to air pressure. The spring 27 acts at one end against the plate 30 and at the other end is maintained stationary by a cup 32. The cup and accompanying plate 21 are anchored to a frame element 33 by appropriate bolts 34 equipped with nuts 35 and lock washers 36. When pressure is applied through the inlet port 28 to the section 24 of the chamber, the diaphragm is moved downwardly, as illustrated in Figures 4 and 5, thereby moving the push rod or plunger 26 in a direction to set the brakes at the respective wheel locations. The condition of the mechanism when the brake is set and after movement in the direction of the arrow is shown in Figure 5.

If it be assumed that a figure of one-half inch is representative of a safe margin for remaining available travel of the plunger to set the brake in each instance, there will be a proportionately longer travel allowable for setting the brake when it is initially applied without it being necessary to rely upon an indication of braking condition. To indicate when the initial travel has been consumed without application of the brakes and that there remains only about one-half inch, there is provided in the invention herein disclosed a unitary device embodied in a sleeve 37 of collapsible material retained at one end in a cup 41 and at the other end in a cup 43. A light spring 40 which is a substantially conical coiled spring having a length from end to end equal to about one-half inch is secured in the cup 41 by fingers 38 bent over the end coil of the spring. The cup 41 may be pressed against the plate 30 by action of the spring 27 which acts also against the cup 43. At the lower or free end of the spring 40, as viewed in Figure 4 is a contact bridge 42 securely attached to the lowermost turn of the spring.

Located within the cup 32 is a switch casing 43 of dielectric material having a central wall 44 surrounding the push rod 26. On an upper wall 45 of the switch casing is a contact 46 to which is attached an electric wire 47 which may be connected to ground. A second contact 48 of a similar character has a wire 49 connected thereto which may in the system disclosed be considered as an energized or hot wire. It is apparent, therefore, that when the diaphragm is moved from the position of Figure 4 to the position of Figure 5, upon energization of the brake mechanism by application of compressed air, when the plunger is moved to a point where about one-half inch travel remains available, the bridge contact 42 will bridge across the contacts 46 and 48 making an electrical connection between them, thereby to complete the circuit between the wires 47 and 49.

By reference to Figure 3 it will be noted that the wire 49, for example, is connected to an indicator light 50 in an indicator panel 51. The light 50 is also connected through a wire 52 and fuse 53 to a source 54 of electricity which may be a battery and thence through a ground wire 55 to ground. A second indicator light 50', also located on the panel, is connected in a similar fashion through a wire 49' to a contact 48' on one side and through a wire 52' on the other side. Connected as shown when a contact bridge 42 interconnects a contact 46' with the contact 48', the indicator light 50' will be energized. It will be appreciated, of course, that any number of indicator lights may be employed, one for each of the brake mechanisms. There will be naturally as many indicator lights on the panel 50 as there are brake mechanisms on the vehicle, the condition of which needs to be tested. Exemplary of a typical condition for a vehicle with no more than four wheels is the showing of Figure 3 wherein four indicator lights 50, 50', 50", and 50''' are shown. In each instance the indicator light is connected to a system of the same kind shown and described in detail in Figures 4 and 5.

It becomes very necessary in the successful operation of the device that the operator be capable of determining whether or not the lights on the panel are functioning before any attempt is made to test the condition of the brakes. For this purpose there is provided a test switch comprising a switch arm 60 mounted on a shaft 61 and in fact having the shape of a push and pull knob. The shaft 61 is reciprocatably mounted in a bushing 62 on the panel 51. At the inner end of the shaft is a multiple contact member 63 from which a wire 64 extends to ground. A spring 65 acting between the multiple contact member and the rear face of the panel 51 serves to normally hold the contact member in open position.

The test switch mechanism includes contacts 66 and 67 shown in Figure 2 and also, for a four-way system, contacts 68 and 69 as shown in Figure 3. The contact 66, for example, is interconnected by means of a wire 70 to the indicator light 51 on the side which is likewise connected to the contact 48' in a housing 19'. Similarly the contact 67 is connected through a wire 71 to the contact 48 in the housing 19 through the wire 49. The other contacts 68 and 69 in a four-wheel vehicle are adapted for connection similarly to appropriate brake mechanisms.

When the indicator lights are to be tested, the switch arm or pull button 60 is pulled outwardly until the multiple contact member 63 bridges all of the contacts 66, 67, 68 and 69. This operation connects all of the indicator lights directly to the source of electric power and thence to ground and will indicate whether or not all of the lights are capable of burning. After this test has been made, the pull is released and the spring 65 will cause the multiple contact member to be removed from the contact points, thereby breaking the electric circuit.

Thereafter the brakes may be tested by applying power in the usual fashion. As previously noted, when the pair of contacts 46, 48 are bridged by the contact bridge 42 and the contacts 46', 48' are bridged by the contact bridge 42', the appropriate indicator lights are lit. If this condition be found before the vehicle leaves on its expected run, it will be known that at that stage of operation there is insufficient remaining available plunger movement to warrant sending the vehicle out on the road. The brakes accordingly should be adjusted to provide a greater available travel. If the brakes are properly adjusted, the contact bridges will not reach a point of engagement with the contacts and hence no indicator lights will burn, thereby indicating to the operator or inspector that the brakes are in working order.

Should it be desired to make the test after the vehicle has been operating as, for example, when the vehicle has been running for some distance down a long grade with brakes applied either lightly or intermittently, the operator has an automatic indication as to when any one or all of the brakes reach a condition where there is no available movement left for the plunger but the minimum requirement. Inasmuch as the operator will be normally making brake application to arrest movement of the vehicle by appropriate movement of corresponding push rods or plungers, those contacts will be made when, for example, the brake becomes so hot that only a minimum travel remains for the plunger. Obviously a four-wheel vehicle may be counted upon to operate with three good brakes and one near the minimum range point. It will, however, be an indication that the vehicle should be brought to rest to permit the brakes to cool sufficiently to warrant further travel.

Although emphasis has been placed hereinbefore upon a four-wheel vehicle, it will be appreciated that for trailer operation like that shown in Figure 1, a corresponding set of brake indicator devices should be applied to the wheels of the trailer. Present requirements demand location of a panel 75 for the trailer wheel brakes on the forward wall 76 of the trailer 11 where it is visible in a rear view mirror 77 from the cab and also visible to an inspector standing on the ground alongside of the truck and trailer equipment. The panel 75 may be identical to the panel 51 in all respects such that all indicator lights can be tested in the same fashion whenever desired and that so that any one or all of the lights may show when corresponding plunger travel for the respective brakes reaches the minimum desired.

There has accordingly been described herein a positive acting brake condition indicator means readily visible by the operator in the cab and one which automatically registers a dangerous minimum brake condition in any one or all of the brakes as promptly as it occurs during travel of the vehicle on the highway. All indicator lights or appropriate electrical indicating means chosen may be tested in advance of operation by the simple testing switch shown and described.

Moreover, the added indicator equipment featured in part in the spring 40 is contained entirely within the usual spring 27 so that there is no interference with action of the spring 27. The spring 40 is capable of collapsing into a compact bundle no thicker than the thickness of spring wire and hence cannot interfere with the full desired length of travel of the push rod. The contacts 46 and 48, for example, being necessarily no more than point contacts, can be compactly contained within the housing so that there is no impediment to full plunger travel on all occasions.

It will be appreciated further that inasmuch as brake conditions may differ, the length of the spring 40 may be varied to suit different conditions but that once installed, it will always operate in a predetermined manner.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. In a brake having an actuating plunger therefor adapted upon actuation to apply the brake throughout a range of travel of the plunger the combination of an indicator system indicative of a pre-set remaining amount of plunger travel operable to set the brake, said system comprising a housing, an electric indicator contact, a resilient collapsible element secured to the plunger, said element having an effective extended dimension equal to a pre-set amount of remaining plunger travel sought to be indicated, a contact closing member on the collapsible element adapted to interconnect said contact and ground when the plunger is actuated through a brake setting cycle wherein the brake remains unset until contact is made, and an electrically actuated warning signal having one terminal grounded and another terminal connected to said contact.

2. In a brake having an actuating plunger therefor adapted upon actuation to apply the brake throughout a range of travel of the plunger the combination of an indicator system indicative of a pre-set remaining amount of plunger travel operable to set the brake, said system comprising a plunger housing, an electric ground contact on said housing and an electric hot contact on said housing, a resilient collapsible element mounted on the plunger, said element having an effective extended dimension equal to a pre-set amount of remaining plunger travel sought to be indicated, a contact bridge on the collapsible element adapted to interconnect said contacts when the plunger travel reaches a location wherein only said pre-set amount remains, and an electrically actuated warning signal having one terminal grounded and another terminal connected to said hot contact on said housing.

3. In a wheeled vehicle having a wheel brake and a push rod assembly for the brake the combination of a housing providing a chamber, said push rod assembly comprising a plunger and a flexible member secured to said plunger and dividing said chamber into a first section subject to a source of high pressure fluid for actuating the plunger and a second section, inlet and exhaust passage means for said first section, a coiled return spring mounted with one end in engagement with the push rod assembly and the other end in engagement with a wall of said housing opposite said diaphragm, a collapsible element of tension lighter than said return spring, said collapsible element having an extended dimension equal to a pre-set distance indicative of a remaining available brake setting movement of the plunger, said collapsible element having one end secured to the push rod assembly, an electric indicator contact on said housing adapted to be interconnected with ground upon engagement by said collapsible element, and an electric indicator light in circuit with said indicator contact adapted to be energized when the contact is interconnected with ground whereby to signal the reaching of said plunger of its remaining available brake setting movement.

4. In a brake having an actuating plunger element therefor adapted upon actuation to apply the brake throughout a range of travel of the plunger element the combination of an indicator system indicative of a pre-set remaining amount of plunger element travel operable to set the brake, said system comprising a housing element, a resilient collapsible member operably associated with said elements, said rmember having an effective extended dimension equal to a pre-set amount of remaining plunger element travel sought to be indicated, an electric circuit having an electrically actuated warning signal therein, switch means in said circuit and a switch actuator subject to operation by said member during movement of said plunger element through a brake setting cycle wherein the brake when defective remains unset until said switch is actuated.

5. In a brake having an actuating plunger element therefor adapted upon actuation to apply the brake throughout a range of travel of the plunger element the combination of an indicator system indicative of a pre-set remaining amount of plunger element travel operable to set the brake, said system comprising a housing element, an electric indicator contact, a resilient collapsible member secured to one of said elements, said member having an effective extended dimension equal to a pre-set amount of remaining plunger element travel sought to be indicated, a contact closing member on the other element adapted to interconnect said contact and ground when the plunger element is actuated through a brake setting cycle wherein the brake setting potential when defective remains unused until contact is made, and an electrically actuated warning signal having one terminal grounded and another terminal connected to said contact.

6. In a brake having an actuating plunger element therefor adapted upon actuation to apply the brake throughout a range of travel of the plunger element the combination of an indicator system indicative of a pre-set remaining amount of plunger element travel operable to set the brake, said system comprising a plunger housing element, an electric ground contact on said housing element and an electric hot contact on said housing element, a resilient collapsible member mounted on the plunger element, said member having an effective extended dimension equal to a pre-set amount of remaining plunger element travel sought to be indicated, a contact bridge on one of said members adapted to interconnect said contacts when the plunger element travel reaches a location wherein only said pre-set amount remains, and an electrically actuated warning signal having one terminal grounded and another terminal connected to said hot contact on said housing element.

7. In a brake having an actuating plunger element therefore adapted upon actuation to apply the brake throughout a range of travel of the plunger element the combination of an indicator system indicative of a pre-set remaining amount of plunger element travel operable to set the brake, said system comprising a housing element, an electric indicator contact, a resilient collapsible member secured to one of said elements, said member having an effective extended dimension equal to a pre-set amount of remaining plunger element travel sought to be indicated, a contact closing means on the other element adapted to interconnect said contact and ground when the plunger element is actuated through a brake setting cycle wherein the brake setting potential when defective remains unused until contact is made, an electrically actuated warning signal having one terminal grounded and another terminal connected to said contact, and means forming a sealed closure around said collapsible member and said contacts whereby to exclude dirt from the electric contacts.

8. In a wheeled vehicle having a wheel brake and a push rod assembly for the brake the combination of a housing providing a chamber, said push rod assembly comprising a plunger and a flexible member secured to said plunger and dividing said chamber into a first section subject to a source of high pressure fluid for actuating the plunger and a second section, inlet and exhaust passage means for said first section, a coiled return spring mounted with one end in engagement with the push rod assembly and the other end in engagement with a wall of said housing opposite said flexible member, a collapsible element of tension lighter than said return spring, said collapsible element having an extended dimension equal to a pre-set distance indicative of a remaining available brake setting movement of the plunger, said collapsible element having one end secured to the push rod assembly, an electric indicator contact on said housing adapted to be interconnected with ground upon engagement by said collapsible element, an electric indicator light in circuit with said indicator contact adapted to be energized when the contact is interconnected with ground whereby to signal the reaching of said plunger of its remaining available brake setting movement, and a flexible sleeve surounding said resilient collapsible member, said sleeve being sealed at one end thereof upon said push rod assembly and at the other end thereof to the housing around said electric indicator contact, whereby to exclude dirt from said contact.

References Cited in the file of this patent
UNITED STATES PATENTS

| | | |
|---|---|---|
| 1,706,986 | Ryder | Mar. 26, 1929 |
| 2,183,700 | Sinclair | Dec. 19, 1939 |